United States Patent
Byun et al.

(10) Patent No.: US 8,632,911 B2
(45) Date of Patent: Jan. 21, 2014

(54) RECHARGEABLE BATTERY

(75) Inventors: Sang-Won Byun, Suwon-si (KR);
Yong-Sam Kim, Suwon-si (KR);
Sung-Bae Kim, Suwon-si (KR);
Hyo-Seob Kim, Suwon-si (KR);
Chi-Young Lee, Suwon-si (KR)

(73) Assignees: Samsung SDI Co., Ltd., Yongin-Si, Gyeonggi-Do (KR); Robert Bosch GmbH, Stuttgart (DE)

(*) Notice: Subject to any disclaimer, the term of this patent is extended or adjusted under 35 U.S.C. 154(b) by 1018 days.

(21) Appl. No.: 12/656,085

(22) Filed: Jan. 15, 2010

(65) Prior Publication Data
US 2011/0177387 A1    Jul. 21, 2011

(51) Int. Cl.
*H01M 2/00* (2006.01)
*H01M 2/02* (2006.01)
*H01M 2/12* (2006.01)

(52) U.S. Cl.
USPC ............. 429/178; 429/61; 429/163; 429/56; 429/82

(58) Field of Classification Search
None
See application file for complete search history.

(56) References Cited

U.S. PATENT DOCUMENTS

| | | | |
|---|---|---|---|
| 6,143,440 A | 11/2000 | Volz et al. | |
| 6,342,826 B1* | 1/2002 | Quinn et al. | 337/300 |
| 2003/0013005 A1* | 1/2003 | Chang | 429/53 |
| 2004/0126650 A1* | 7/2004 | Kim | 429/61 |
| 2004/0170887 A1 | 9/2004 | Masumoto et al. | |
| 2007/0182020 A1* | 8/2007 | Trezza et al. | 257/777 |
| 2008/0070067 A1 | 3/2008 | Jang et al. | |
| 2010/0028762 A1* | 2/2010 | Yokoyama et al. | 429/94 |
| 2010/0279156 A1* | 11/2010 | Kim et al. | 429/56 |

FOREIGN PATENT DOCUMENTS

| | | | |
|---|---|---|---|
| JP | 05-251290 A | | 9/1993 |
| JP | 10-326610 | * | 8/1998 |
| JP | 11-040203 A | | 2/1999 |
| JP | 2003-051304 A | | 2/2003 |
| JP | 2004-319463 A | | 11/2004 |
| JP | 2005-032477 A | | 2/2005 |
| JP | 2006-012602 | * | 12/2006 |
| KR | 10-2001-0011900 A | | 2/2001 |
| KR | 10-0693115 B1 | | 3/2007 |

OTHER PUBLICATIONS

Examiner Annotated Figure 1 of Morio (Jun. 20, 2013).*
Korean Office Action in KR 10-2010-0062874, dated Apr. 4, 2012 (Byun, et al.).
European Office Action in EP 10170406.2-1227, dated Jul. 19, 2011 (Byun, et al.).

* cited by examiner

*Primary Examiner* — Ula C Ruddock
*Assistant Examiner* — Matthew Van Oudenaren
(74) *Attorney, Agent, or Firm* — Lee & Morse, P.C.

(57) ABSTRACT

A rechargeable battery includes an electrode assembly in a battery case, the electrode assembly including a positive electrode, a negative electrode, and a separator, a cap plate connected to the battery case, the cap plate including a short member configured to deform and electrically connect the positive and negative electrodes, and a current collecting portion including at least one fuse, the at least one fuse being electrically connected to one of the negative and positive electrodes of the electrode assembly.

22 Claims, 12 Drawing Sheets

RECHARGEABLE BATTERY

BACKGROUND

1. Field

Exemplary embodiments relate to a rechargeable battery. More particularly, exemplary embodiments relate to a rechargeable battery having a safety device that can prevent explosion by solving an overcharging state.

2. Description of the Related Art

A rechargeable battery, i.e., a secondary battery, may be repeatedly charged and discharged. For example, low-capacity rechargeable batteries may be used for portable compact electronic apparatuses, e.g., mobile phones, notebook computers, and camcorders, while high-capacity rechargeable batteries may be used, e.g., as a power source for driving a motor of a hybrid vehicle, etc.

A high-output rechargeable battery may include an electrolyte, e.g., a non-aqueous electrolyte, and may have high energy density. The high-output rechargeable battery may have high capacity by connecting a plurality of unit rechargeable batteries in series in order to drive a motor of an apparatus requiring a large amount of power, e.g., an electrical vehicle, etc. For example, one large-capacity rechargeable battery may include a plurality of rechargeable batteries coupled in series, and may be formed in a cylindrical or prismatic shape. However, if excess heat or pressure is generated inside the rechargeable battery, e.g., due to dissolution of an electrolyte solution, the rechargeable battery may explode or combust.

The above information disclosed in this Background section is only for enhancement of understanding of the background of the invention and therefore it may contain information that does not form the prior art that is already known in this country to a person of ordinary skill in the art.

SUMMARY

Embodiments are therefore directed to a rechargeable battery, which substantially overcomes one or more of the problems due to the limitations and disadvantages of the related art.

It is therefore a feature of an embodiment to provide a rechargeable battery with a safety device configured to short-circuit the rechargeable battery during an overcharge, thereby preventing explosion of the rechargeable battery.

At least one of the above and other features and advantages may be realized by providing a rechargeable battery, including an electrode assembly in a battery case, the electrode assembly including a positive electrode, a negative electrode, and a separator, a cap plate connected to the battery case, the cap plate including a short member configured to deform and electrically connect the positive and negative electrodes, and a current collecting portion including at least one fuse, the at least one fuse being electrically connected to one of the negative and positive electrodes of the electrode assembly.

The cap plate may include at least one terminal electrically connected to the electrode assembly, the short member electrically contacting an external portion of the at least one terminal after being deformed. The fuse may be thinner than other segments of the current collecting portion. The fuse may be integral with and connects two segments of the current collecting portion. The fuse may have at least one opening. The at least one opening of the fuse may be between a terminal joining portion of the current collecting portion and an electrode assembly joining portion of the current collecting portion. The at least one opening of the fuse may be coplanar with a terminal hole in the current collecting portion. The at least one opening of the fuse may be in a plane substantially perpendicular to a plane of a terminal hole in the current collecting portion. The fuse may include a first material and a vertical portion of the current collecting portion may include a second material, the first and second materials being different from each other. The first material may have a lower melting point than the second material. The fuse may directly contact a terminal in the cap plate. The rechargeable battery may further include an insulation layer between the cap plate and the current collecting portion, the insulation layer overlapping at least a portion of the fuse. The fuse may be a thermal fuse. The fuse and the short member may be electrically connected in series when the short member is deformed.

The short member may have a convex shape protruding toward an interior of the battery case, the convex shape of the short member being configured to deform and protrude away from the interior of the battery to electrically connect the positive and negative electrodes of the electrode assembly. The short member may include a notch configured to break when the short member is deformed. The cap plate may include an opening therethrough, the short member being positioned in the opening. The rechargeable battery may further include a short tab on the cap plate, the short tab being electrically connected to a terminal in the cap plate. The cap plate may include an opening therethrough, the short tab overlapping the opening and the short member. The short tab and the short member may be directly contacting each other when the short member is deformed. The fuse may be configured to blow in response to a contact between the short member and the short tab. The short member may include a middle member, the middle member contacting the short tab when the short member is deformed.

BRIEF DESCRIPTION OF THE DRAWINGS

The above and other features and advantages will become more apparent to those of ordinary skill in the art by describing in detail exemplary embodiments with reference to the attached drawings, in which.

Figure 1:
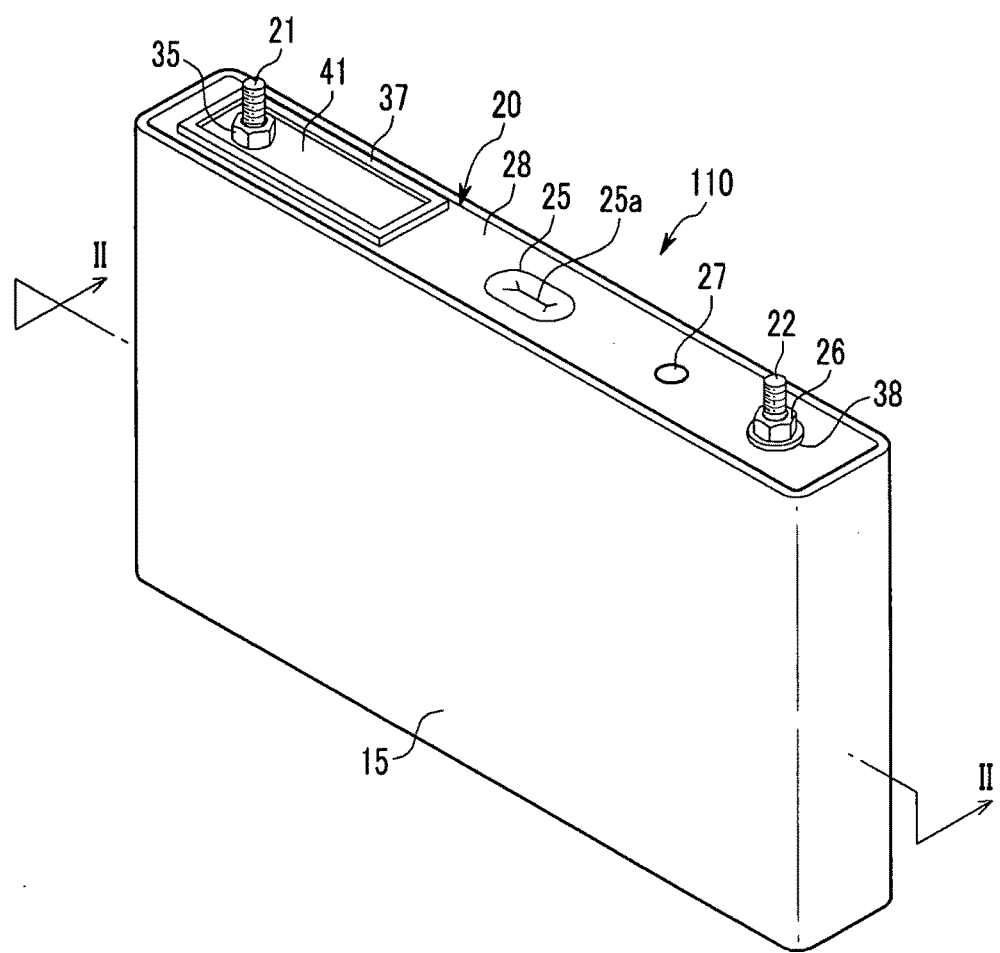
FIG. 1 illustrates a perspective view of a rechargeable battery according to an exemplary embodiment.

REFERENCE NUMERALS INDICATING
PRIMARY ELEMENTS IN THE DRAWINGS

| 10: | electrode assembly |
| 11: | first electrode |
| 12: | second electrode |
| 110: | rechargeable battery |
| 13: | separator |
| 15: | case |
| 20: | cap assembly |
| 21: | first terminal |
| 22: | second terminal |
| 23: | short hole |
| 28: | cap plate |
| 31: | first electrode lead tab |
| 32: | second electrode lead tab |
| 31a, 32a: | fuse portion |
| 38: | connection plate |
| 43: | short member |
| 45: | middle member |

DETAILED DESCRIPTION

Exemplary embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" or "under" another layer or substrate, it can be directly on or under the other layer or substrate, or intervening layers may also be present. In addition, it will also be understood that when a layer is referred to as being "between" two layers, it can be the only layer between the two layers, or one or more intervening layers may also be present. Like reference numerals refer to like elements throughout.

Figure 2:
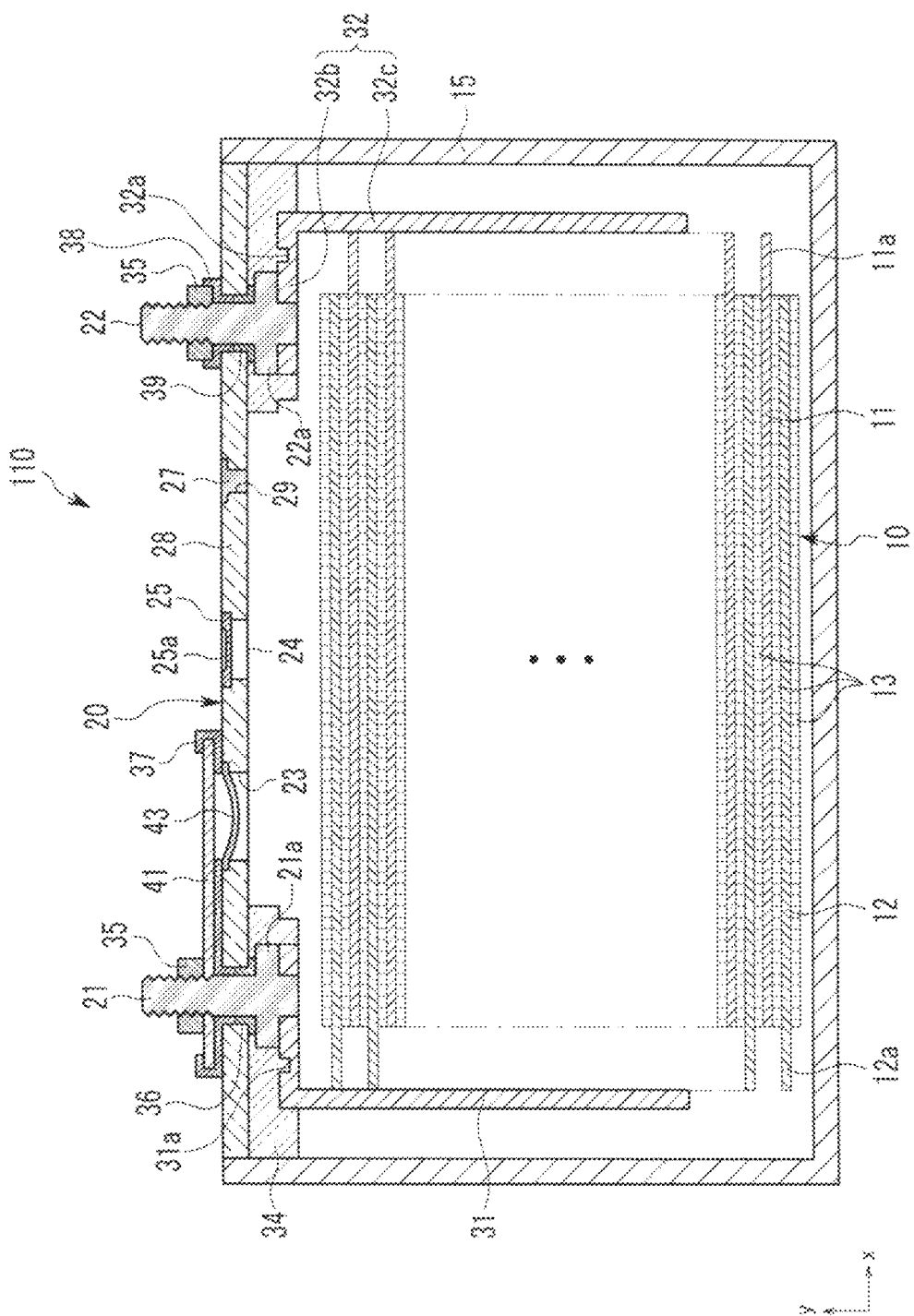
FIG. 2 illustrates a cross-sectional view along the line II-II of FIG. 1.

FIG. 1 illustrates a perspective view of a rechargeable battery according to a first exemplary embodiment. FIG. 2 illustrates a cross-sectional view of FIG. 1 along line II-II.

Referring to FIGS. 1 and 2, a rechargeable battery 110 according to an exemplary embodiment may include an electrode assembly 10, a case 15, and a cap assembly 20. A separator 13 may be disposed between a first electrode 11 and a second electrode 12, and may be spirally wound with the first electrode 11 and the second electrode 12 in the electrode assembly 10. The electrode assembly 10 may be installed in the case 15 and the cap assembly 20 may be positioned to close an opening of the case 15.

The rechargeable battery 110 may be any suitable type of any suitable shape. For example, the rechargeable battery 110 may be a prismatic type of lithium ion secondary battery. However, exemplary embodiments are not limited thereto and may be applied to various types of batteries, e.g., a lithium polymer battery or a cylindrical battery.

The first electrode 11 and the second electrode 12 may include coated regions and uncoated regions in a current collecting body formed of a thin plate metal foil. The coated regions may be coated with an active material, and the uncoated regions may not be coated with the active material.

For example, the first electrode 11, e.g., a positive electrode, may include a positive uncoated region 11a at one side end along a length direction thereof, and the second electrode 12, e.g., a negative electrode, may include a negative uncoated region 12a at the other side end along a length direction thereof.

The first electrode 11 and the second electrode 12 may interpose the separator 13 therebetween and may be spirally wound. However, exemplary embodiments are not limited thereto, and the electrode assembly 10 may have a structure in which positive and negative electrodes, respectively formed of a plurality of sheets, may be stacked with a separator therebetween.

The case 15 may have any suitable shape, e.g., a cuboid, and may include an opening in one side thereof. The cap assembly 20 may include a cap plate 28 that covers the opening of the case 15, a first terminal 21 electrically connected to the second electrode 12, and a second terminal 22 electrically connected to the first electrode 11.

The cap plate 28 may be formed of a thin plate and may be connected to the case 15 to seal the opening of the case 15. In the cap plate 28, a sealing cap 27 may be formed in an electrolyte injection opening 29, and a vent plate 25 with a notch 25a may be formed in a vent hole 24. The notch 25a of the vent plate 25 may open at a predetermined pressure level.

The first terminal 21 and the second terminal 22 may penetrate the cap plate 28, e.g., extend outside the cap plate 28, and may include respective flanges 21a and 22a inside the case 15. The flanges 21a and 22a may be formed in lower portions of respective first and second terminals 21 and 22, i.e., under the cap plate 28, for support. External circumferential surfaces of upper poles of the first and second terminals 21 and 22, i.e., portions outside the cap plate 28, may be threaded. In addition, nuts 35 that support the terminals 21 and 22 at upper portions thereof may be fastened to the terminals 21 and 22, e.g., via the threaded portions.

Gaskets 36 and 39 may be respectively installed between the first terminal 21 and the cap plate 28 and between the second terminal 22 and the cap plate 28 to seal gaps between the terminals 21 and 22 and the cap plate 28.

The first terminal 21 may be electrically connected to the second electrode 12 through a first lead tab 31, e.g., a negative electrode lead tab 31, and the second terminal 22 may be electrically connected to the first electrode 11 through a second lead tab 32, e.g., a positive electrode lead tab 32. The first lead tab 31 and the second lead tab 32 may have fuse portions 31a and 32a, respectively, as will be described in more detail below with reference to FIG. 3. It is noted that a "lead tab" and a "current collecting portion" may be used hereinafter interchangeably.

In the present exemplary embodiment, the fuse portions 31a and 32a are formed in both of the first lead tab 31 and second lead tab 32, respectively. However, exemplary embodiments are not limited thereto and may include additional fuse portion configurations, e.g., the fuse portion may be formed in one of the first lead tab 31 and the second lead tab 32. In addition, other terminal configurations are included within the scope of the exemplary embodiments, e.g., the first terminal may be connected to the first electrode and the second terminal may be connected to the second electrode.

Figure 3:
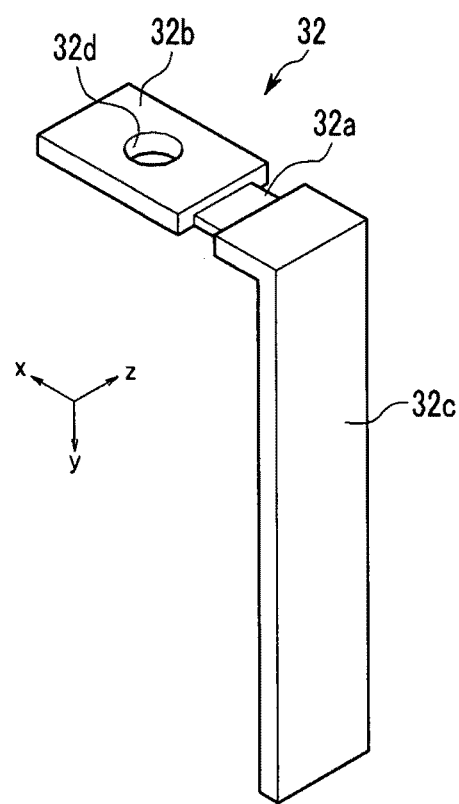
FIG. 3 illustrates a perspective view of a lead tab according to an exemplary embodiment.

FIG. 3 illustrates an enlarged perspective view of the second lead tab 32. It is noted that the positive electrode lead tab and the negative electrode lead tab will be described in further detail. Since the negative electrode lead tab and the positive electrode lead tab have the same structure, only the second lead tab 32 will be described instead of describing both. Referring to FIG. 3, the second lead tab 32, e.g., the negative electrode lead tab, may include a terminal joining portion 32b, an electrode assembly joining portion 32c, and the fuse portion 32a.

The terminal joining portion 32b may be under the cap plate 28, i.e., between the cap plate 28 and the electrode assembly 10, and may include a terminal hole 32d. The second terminal 22 may extend through the cap plate 28 toward the electrode assembly 10 and may be inserted into the terminal hole 32d. For example, the terminal joining portion 32b may be parallel to the cap plate 28, so the terminal hole 32d in the terminal joining portion 32b, i.e., a circular cross-section of the terminal hole 32d in the xz-plane, may be substantially parallel to, i.e., in a parallel plane with, the cap plate 28.

The electrode assembly joining portion 32c may be under the cap plate 28, e.g., the electrode assembly joining portion 32c may extend between the terminal joining portion 32b and a bottom of the case 15. The electrode assembly joining portion 32c may be connected, e.g., welded, to the positive uncoated region 11a. For example, the electrode assembly joining portion 32c and the terminal joining portion 32b may be arranged to have a L-shaped cross-section in the xy-plane.

The fuse portion 32a may be disposed between, e.g., directly between, the terminal joining portion 32b and the electrode assembly joining portion 32c. For example, the fuse portion 32a may be integral with the terminal joining portion 32b and the electrode assembly joining portion 32c. For example, the electrode assembly joining portion 32c, the terminal joining portion 32b, and the fuse portion 32a therebetween may be arranged to have a L-shaped cross-section in the xy-plane. The fuse portion 32a may be arranged in any suitable portion of the second lead tab 32. For example, as illustrated in FIG. 3, the fuse portion 32a may be in a plane substantially parallel to the terminal hole 32d, i.e., in the xz-plane, so the electrode assembly joining portion 32c may be vertically bent after passing the fuse portion 32a. In another example, a fuse portion may be in, e.g., upper end of, the electrode assembly joining portion 32c along a vertical direction, i.e., in the yz-plane.

The fuse portion 32a may be placed higher than the electrode assembly 10, i.e., the fuse portion 32a may be between the cap plate 28 and the electrode assembly 10. Therefore, the fuse portion 32a and an electrolyte, e.g., an electrolyte solution, in the electrode assembly 10 may not contact each other. Therefore, combustion of the electrolyte due to heat generated from the fuse portion 32a may be safely prevented or substantially minimized.

The fuse portion 32a may have a smaller cross-section, i.e., in either plane, than other portions of the second lead tab 32. For example, as illustrated in FIG. 3, the fuse portion 32a may be thinner than the terminal joining portion 32b along the y-axis and/or may be narrower than the terminal joining portion 32b along the z-axis. For example, the fuse portion 32a may include a thermal fuse.

Referring back to FIG. 2, the rechargeable battery 110 may further include a lower insulation member 34 in the case 15. The lower insulation member 34 may be on, e.g., directly on, a lower surface of the cap plate 28, i.e., a surface of the cap plate 28 facing an interior of the case 15, so portions of the terminals 21 and 22 and upper surfaces of the lead tabs 31 and 32 may contact the lower insulation member 34. The lower insulation member 34 may cover, e.g., overlap, upper surfaces of the fuse portions 31a and 32a, e.g., the lower insulation member 34 may be directly between and in contact with the upper surface of the fuse portion 32a and the lower surface of the cap plate 28, as illustrated in FIG. 2.

The rechargeable battery 110 may further include a first short tab 41 electrically connected to the first terminal 21. The first short tab 41 may be on an upper surface of the cap plate 28, i.e., a surface of the cap plate 28 facing away from the electrode assembly 10, and may contact, e.g., directly contact, a portion of the first terminal 21 extending outside the case 15. For example, the first short tab 41 may be external to the case 15, thereby contacting an external portion of the first terminal 21, i.e., a portion of the first terminal 21 outside the case 15. An insulation member 37 that electrically insulates the first short tab 41 from the cap plate 28 may be provided therebetween.

A connection plate 38 electrically connecting the second terminal 22 and the cap plate 28 may be provided in the second terminal 22. The terminal 22 may be inserted into the connection plate 38, and therefore, the connection plate 38 may be adhered to the cap plate 28 through the nut 35 provided thereon.

As illustrated in FIG. 2, the cap assembly 20 may further include a short member 43 that short-circuits the first electrode 11 and the second electrode 12, e.g., when internal pressure of the rechargeable battery 110 reaches a predetermined threshold. In detail, when the internal pressure in the rechargeable battery 110 reaches a predetermined threshold, the short member 43 may deform to electrically contact the first terminal 21, e.g., an external portion of the first terminal 21 via the first short tab 41, to short circuit the first and second electrodes 11 and 12, e.g., the short circuit configuration may be external to the case 15 to eliminate or substantially minimize a possibility of an explosion inside the case 15 due to an internal short circuit. It is noted that while the short member 43 is illustrated in FIG. 2 in close proximity to the first short tab 41 and the first terminal 21, other configurations of the short member 43 within the rechargeable battery 110 are within the scope of the exemplary embodiments. For example, the short member 43 may deform to electrically contact the first or second terminals 21 and 22 via a second short tab, i.e., via the cap plate 28.

As further illustrated in FIG. 2, the cap assembly 20 may include a short hole 23 in the cap plate 28. The short member 43 may be disposed between the insulation member 37 and the cap plate 28 in the short hole 23. The short member 43 may include a curved portion that is convex downwardly, i.e., protrudes toward an interior of the case 15, in an arc shape and an inversion plate having edge portions fixed to the cap plate 28. For example, when pressure increases in the case 15, the curved portion of the short member 43 may deform to protrude away from the interior of the case 15. When the short member 43 deforms, the short member 43 may electrically contact the first terminal 21, thereby electrically connecting the first and second electrodes 11 and 12, i.e., the positive and negative electrodes, of the electrode assembly 10. When the short member 43 deforms to electrically contact the first terminal 21, the fuse portions 31a and/or 32a in respective lead tab 31 and 32 may be coupled in series between the short member 43 and the first electrode 11 and/or the second electrode 12.

For example, as illustrated in FIG. 2, the first short tab 41 may extend to cover, e.g., overlap, the short hole 23. Accordingly, when the short member 43 is deformed upwardly due to increase of internal pressure in the case 15, the first short tab 41 and the cap plate 28 may be electrically connected through the short member 43, thereby causing a short-circuit. When the short-circuit is induced, a large amount of current instantly flows through the battery terminals, so that the fuse portions 31a and 32a in the first lead tab 31 and/or the second lead tab 32 melt, thereby blocking, e.g., interrupting, current between the electrode assembly 10 and the first and/or the second terminals 21 and 22.

According to exemplary embodiments, the rechargeable battery 110 is configured to include at least one fuse portion in a lead tab, e.g., fuse portion 31a and/or 32a, so when a short-circuit is induced in response to a battery overcharge, e.g., in response to an increased internal pressure in the case 15, an instant flow of a large amount of current may melt the fuse portion. Since the fuse portion is in the lead tab, the melted fuse portion may interrupt the electrical connection between the terminal and electrode assembly of the rechargeable battery, thereby stopping current through the lead tab and operation of the battery. When inducing the short-circuit and operation of the fuse portions under a predetermined condition, operation of the rechargeable battery may be stopped before an undesirable situation occurs, e.g., battery explosion, thereby improving safety of the rechargeable battery. Further, when the fuse portion according to exemplary embodiments is melted by excessive current, generation of an arc may be prevented.

In contrast, when positive and negative electrodes are short-circuited in response to overcharge in a conventional rechargeable battery, e.g., in a battery where the fuse portions 31a and 32a are not provided, a short member causing the short circuit may melt due to the large amount of current therethrough after induction of the short-circuit. Accordingly, the short-circuit state may not be maintained after melting of the short member. If the short-circuit state is not maintained, the conventional rechargeable battery may continue the overcharge operation, e.g., internal temperature and pressure may continue to increase by repeat charging or discharging, thereby causing explosion or combustion of the battery. Further, when positive and negative electrodes are short-circuited in response to overcharge in the conventional rechargeable battery, a welded portion, i.e., a portion detached in order to cause the short circuit and block current, may trigger generation of an arc during the detaching of the welded portion, thereby causing combustion. It is further noted that it may be difficult to cut off or discharge current in a conventional prismatic rechargeable battery, e.g., as compared to a cylindrical battery.

Figure 4A:
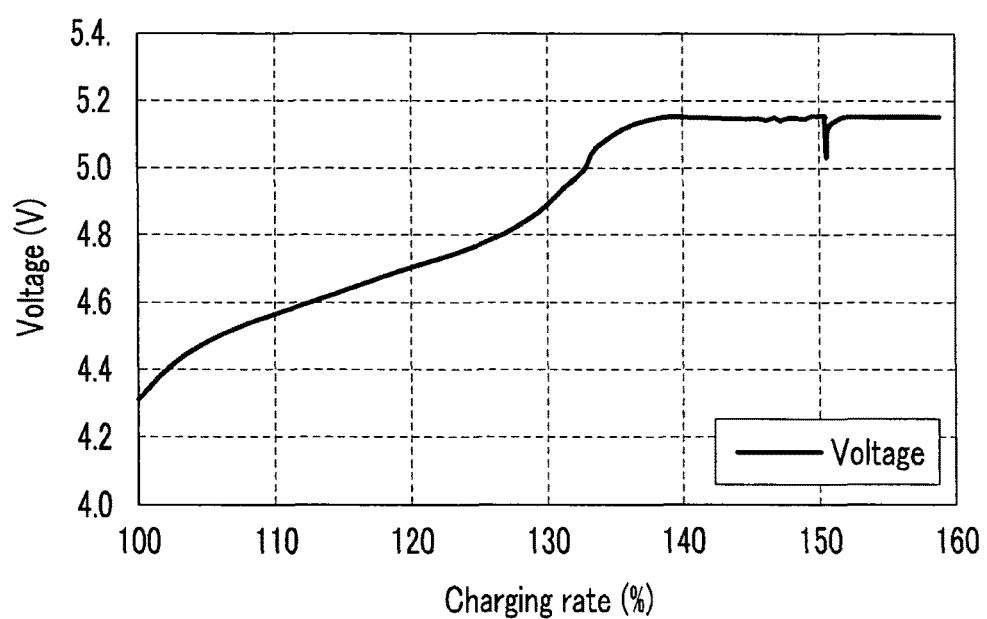
FIG. 4A illustrates a graph showing voltage variation of a conventional rechargeable battery.
Figure 4B:
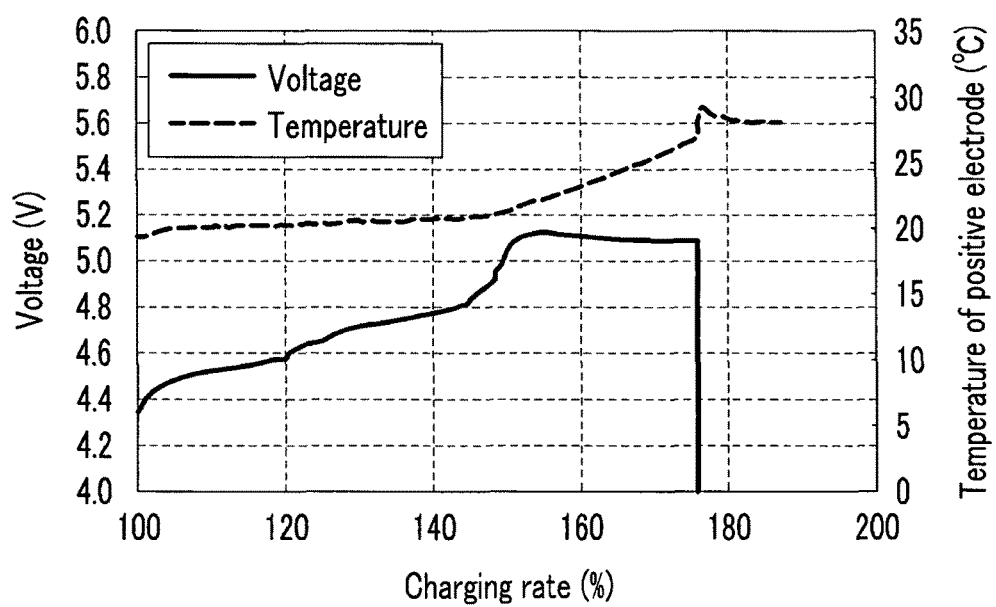
FIG. 4B illustrates a graph showing voltage and temperature variation of a rechargeable battery according to an exemplary embodiment.

FIG. 4A illustrates a graph showing voltage variation when a conventional rechargeable battery, i.e., a rechargeable battery having a short member configured to induce a short circuit in the battery without a fuse, is overcharged. FIG. 4B illustrates a graph showing voltage and temperature variation of a rechargeable battery according to exemplary embodiments.

FIG. 4A and FIG. 4B illustrate voltage variation of an overcharged prismatic rechargeable battery having an output voltage of 4.0 V. The short member of the rechargeable battery of FIG. 4A is set to be deformed when a charging rate of the battery is about 150%. The short member of the rechargeable battery of FIG. 4B is set to be deformed when the charging rate of the battery is between about 170% and about 180%.

In FIG. 4A, as indicated by the negative voltage spike in the graph, the battery is short-circuited by the short member, i.e., after the battery reaches a charging rate of about 150%, but the voltage and overcharge in the battery continues to increase almost immediately due to melting of the short member. In FIG. 4B, however, once the fuse portion melts in response to the short circuit, i.e., after the battery reaches a charging rate of about 175%, the voltage increase and overcharge in the battery stops.

In addition, as further illustrated in FIG. 4B, thermal operational conditions of the rechargeable battery according to exemplary embodiments may be efficiently improved. In detail, unlike a general fuse, when the fuse portion 31a and/or 32a is set to operate when internal short-circuit occurs, thermal conditions for operation of the fuse can be efficiently improved, and therefore resistance and thermal problems can be solved. That is, when the internal short-circuit occurs, a current hundreds times larger than a current flowing at normal operation flows through the fuse portion 31a/32a. Thus, when a fuse operating in such a current is provided, resistance and heat generated in the fuse during normal battery operation may be substantially reduced.

Figure 5:
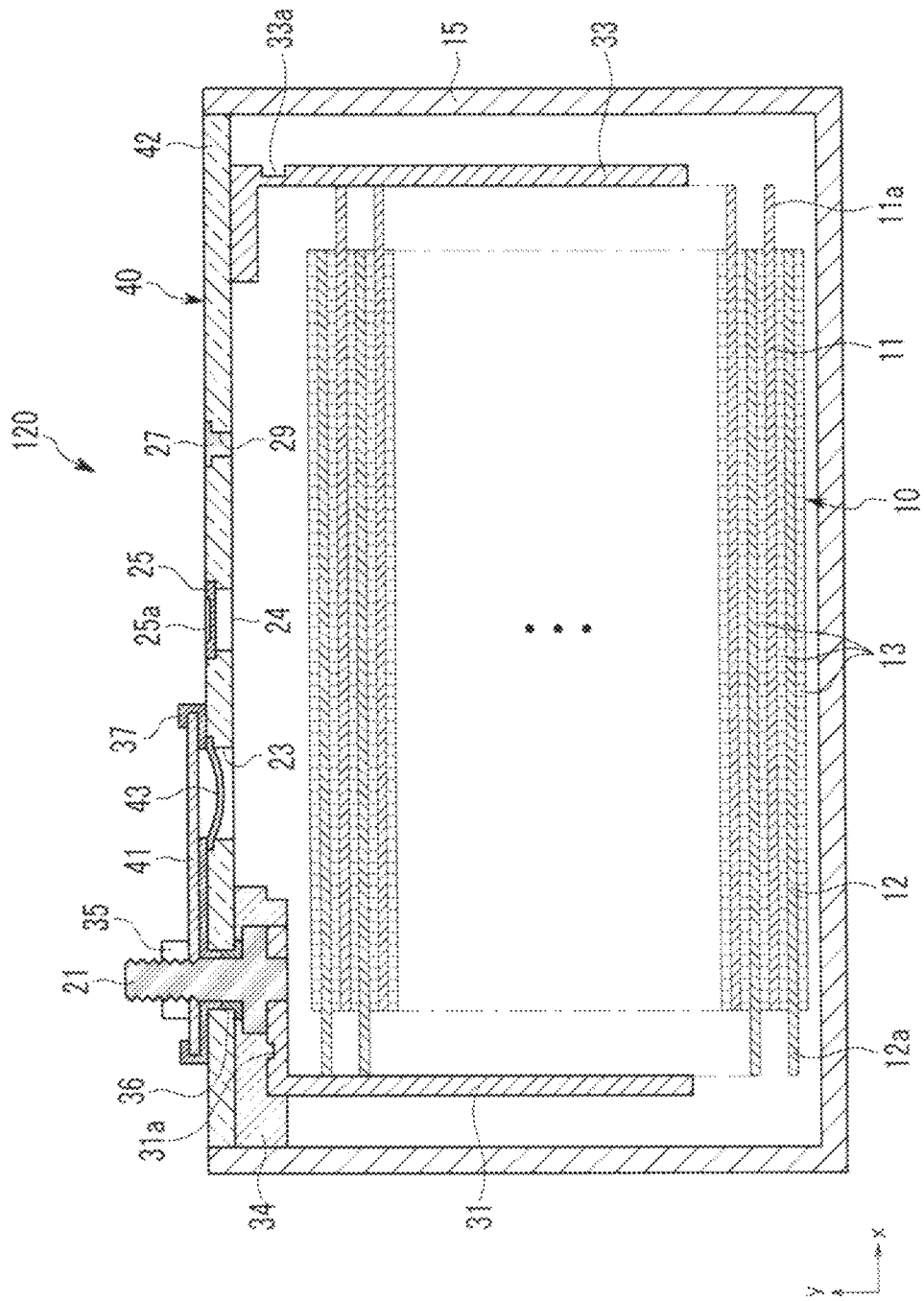
FIG. 5 illustrates a cross-sectional view of a rechargeable battery according to another exemplary embodiment.

FIG. 5 illustrates a cross-sectional view of a rechargeable battery according to a second exemplary embodiment. Referring to FIG. 5, a rechargeable battery 120 is substantially the same as the rechargeable battery 110 described previously with reference to FIGS. 1-3, with the exception of having a single terminal. That is, the second terminal 22 in the rechargeable battery 120 may be eliminated, so the rechargeable battery 120 may include only the first terminal 21.

As illustrated in FIG. 5, the rechargeable battery 120 may include the case 15, and a cap assembly 40 sealing the case 15. The cap assembly 40 may include the first terminal 21 protruded outside the case 15, a cap plate 42 attached to the opening of the case 15, and the first short tab 41 electrically connected to the first terminal 21 and provided on the cap plate 42.

The first terminal 21 may penetrate the cap plate 42 and may protrude outside the case 15. The first terminal 21 may be electrically connected to the second electrode 12 through the first lead tab 31 having the fuse portion 31a. The first lead tab 31 may be deformed, i.e., the fuse portion 31a of the first lead tab 31 may melt in response to a short circuit, as described previously with reference to FIGS. 1-3, and therefore, no further description for the same structure will be provided.

The short member 43 may be inserted into the short hole 23 of the cap plate 42. The short member 43 may be deformed when internal pressure of the case 15 is increased to contact the first short tab 41, as describe previously with reference to FIGS. 1-3, thereby inducing a short-circuit between the cap plate 42 and the first short tab 41.

As further illustrated in FIG. 5, the rechargeable battery 120 may include an electrode lead tab 33 that electrically connects the first electrode 11 and the cap plate 42. A lower end of the lead tab 33 may be welded to a positive uncoated region 11a of the first electrode 11, while and an upper end thereof may be welded to the cap plate 42.

For example, the lead tab 33 may directly contact the cap plate 42, so contact resistance between the first electrode 11 and the cap plate 42 may be minimized. In addition, the lead tab 33 may include a fuse portion 33a with a cross-section of smaller than other portions of the lead tab 33. The fuse portion 33a may be substantially the same as the fuse portion 32a described previously with reference to FIGS. 1-3, with the exception of being positioned in a vertical portion of an electrode assembly joining portion of the lead tab 33. In other words, the fuse portion 33a may be formed in an upper portion of the lead tab 33, so the fuse portion 33a may melt when a short-circuit occurs due to deformation of the short member 43.

Figure 6:
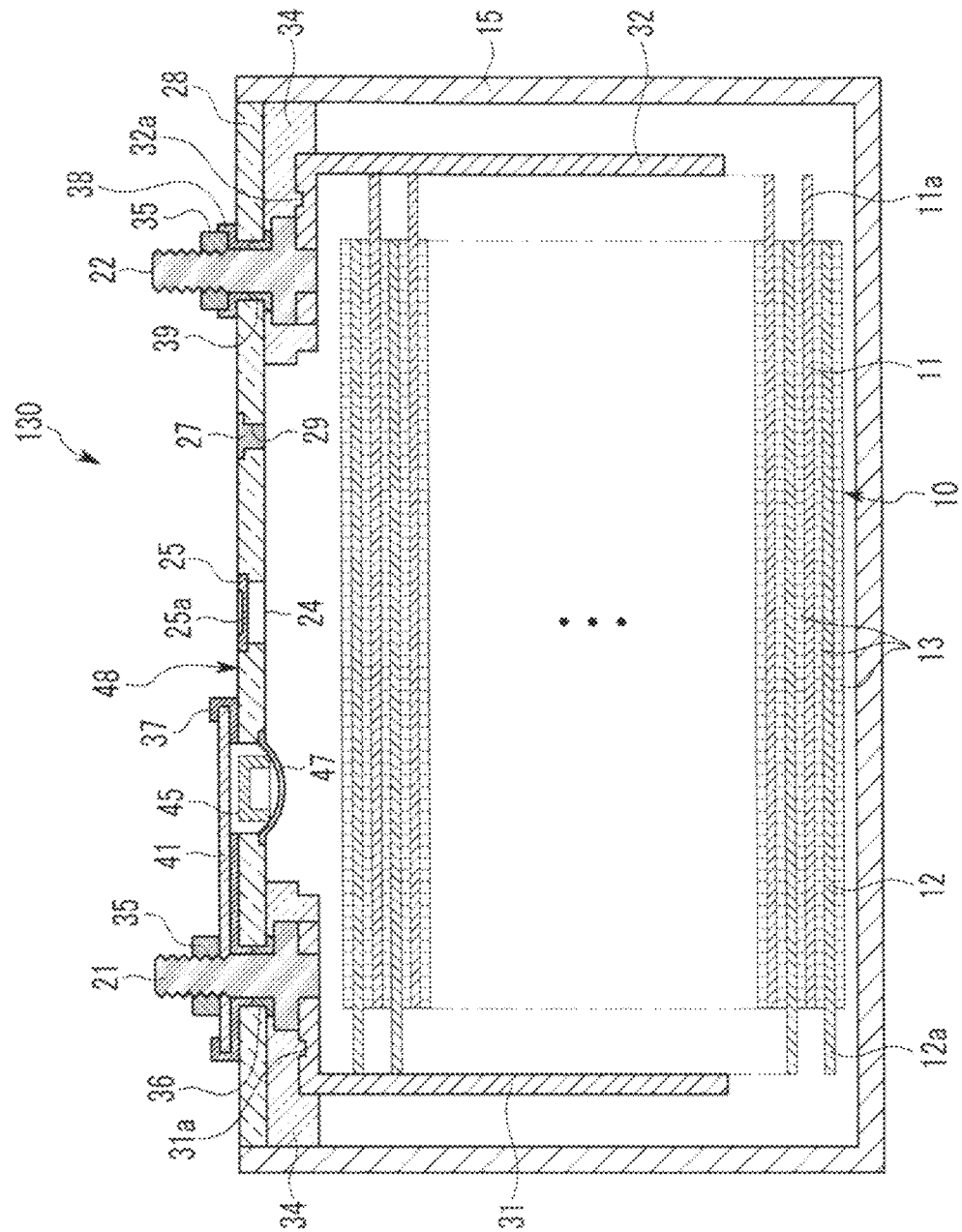
FIG. 6 illustrates a cross-sectional view of a rechargeable battery according to another exemplary embodiment.

FIG. 6 illustrates a cross-sectional view of a rechargeable battery according to a third exemplary embodiment. Referring to FIG. 6, a rechargeable battery 130 is substantially the same as the rechargeable battery 110 described previously with reference to FIGS. 1-3, with the exception of having a middle member 45 on a short member 47.

Referring to FIG. 6, the rechargeable battery 130 may include the case 15 and a cap assembly 48 sealing the case 15. The cap assembly 48 may include the first terminal 21, the second terminal 22, the cap plate 28 attached to the opening of the case 15, and the first short tab 41 that is electrically connected to the first terminal 21 and provided on the cap plate 28. The cap plate 28 may be electrically connected to the second terminal 22 through the connection plate 38.

The first terminal 21 may be electrically connected to the second electrode 12 through the first lead tab 31 having the fuse portion 31a, and the second terminal 22 may be electrically connected to the first electrode 11 through the second lead tab 32 having the fuse portion 32a. The first and second lead tabs 31 and 32 were described previously with reference to FIGS. 1-3, and therefore, no further description for the same structure will be provided.

The short member 47 may be disposed on the lower surface of the cap plate 28, e.g., a portion of the cap plate 28 may be positioned between the short member 47 and the insulation member 37. The short member 47 may include an inversion plate having a convex shape, i.e., protruding downwardly, configured to deform, i.e., protrude upwardly, when internal pressure of the rechargeable battery 130 is increased.

The middle member 45 may be disposed between the first short tab 41 and the short member 47. For example, the middle member 45 may have a cylinder shape. When the middle member 45 is attached to the short member 47, the middle member 45 may be welded to the short member 47 along a bottom circumference of the middle member 45. Therefore, sufficient deformation of the short member 47 may be enabled. In addition, an upper surface of the middle member 45, i.e., a surface facing the first short tab 41, may be disposed parallel to the first short tab 41, e.g., the upper surface of the middle member 45 may be substantially flat, in order to provide sufficient surface contact between the first short tab 41 and the middle member 45.

The weight and shape of the middle member 45 may be controlled for inverse deformation of the short member 47 under a predetermined pressure level. Accordingly, when the short member 47 is deformed upwardly, the middle member 45 may be lifted to contact the first short tab 41, and thus the cap plate 28 may be electrically connected to the first short tab 41 through the short member 47 and the middle member 45.

According to exemplary embodiments, since the short member 47 contacts the first short tab 41 via the middle member 45, the surface contact area between the middle member 45 and the first short tab 41 may be sufficiently large to avoid melting. Since the surface area between the middle member 45 and the first short member 41 is sufficiently large and the middle member 45 is welded to the short member 47, interruption of the short-circuit, i.e., electrical connection therebetween, may be prevented, e.g., at least before melting of the fuse portions 31a and 32a.

Figure 7:
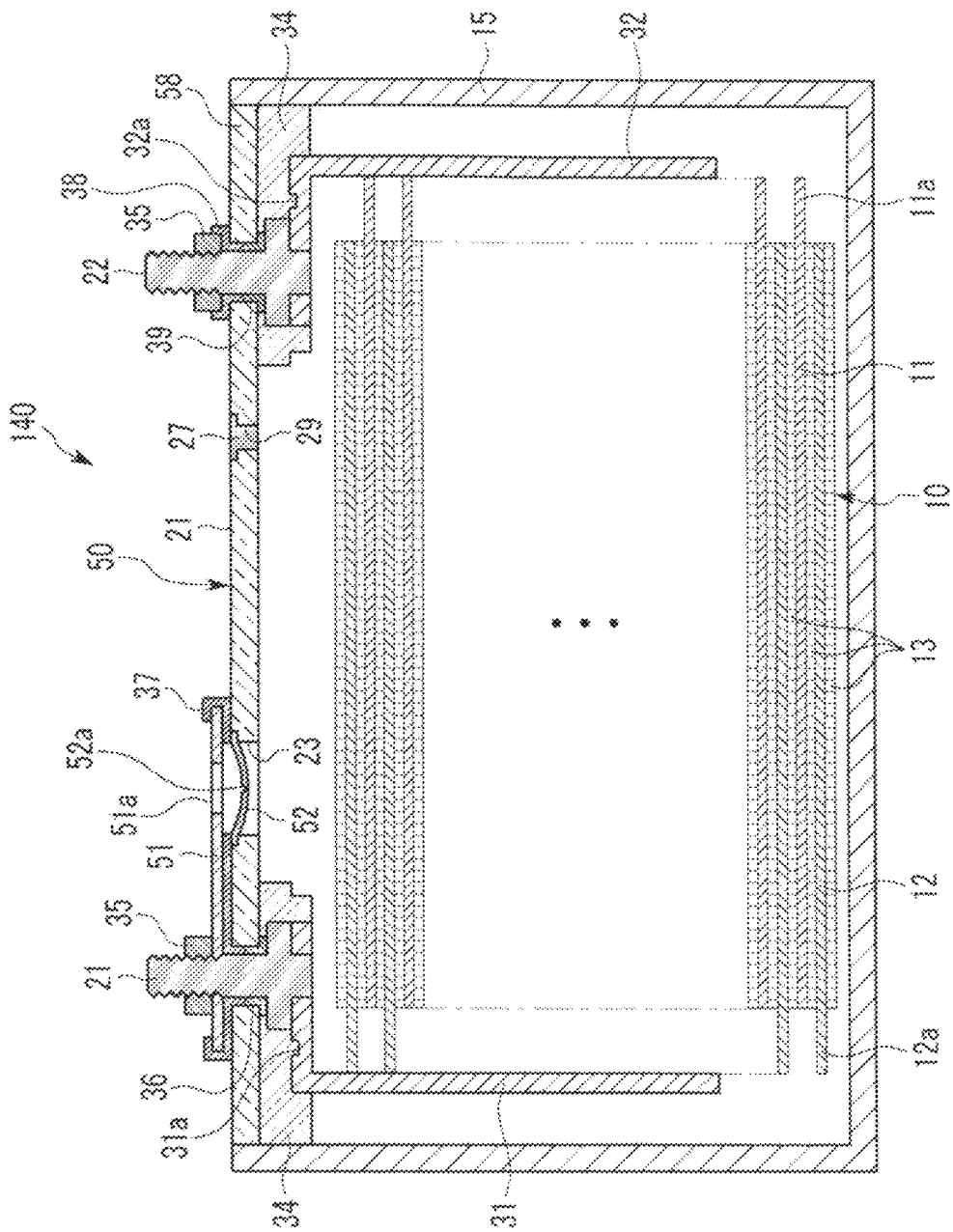
FIG. 7 illustrates a cross-sectional view of a rechargeable battery according to another exemplary embodiment.

FIG. 7 illustrates a cross-sectional view of a rechargeable battery according to a fourth exemplary embodiment. Referring to FIG. 7, a rechargeable battery 140 is substantially the same as the rechargeable battery 110 described previously with reference to FIGS. 1-3, with the exception of a structure of a cap assembly 50.

The rechargeable battery 140 may include the case 15 and the cap assembly 50 sealing the case 15. The cap assembly 50 may include the first terminal 21, the second terminal 22, a cap plate 58 attached to the opening of the case 15, and a first short tab 51 electrically connected to the first terminal 21 and provided on the cap plate 58. The cap plate 58 may be electrically connected to the second terminal 22 through the connection plate 38.

The first terminal 21 may be electrically connected to the second electrode 12 through the first lead tab 31 having the fuse portion 31a, and the second terminal 22 may be electrically connected to the first electrode 11 through the second lead tab 32 having the fuse portion 32a. The first and second lead tabs 31 and 32 were described previously with reference to FIGS. 1-3, and therefore, no further description for the same structure will be provided.

A vent hole 51a may be formed in the first short tab 51. The vent hole 51a may overlap the short hole 23 formed in the cap plate 58. In addition, a short member 52, i.e., a member configured to deform and contact the first short tab 51 to induce a short-circuit, may be inserted into the short hole 53. The short member 52 may be formed of an inversion plate, and may include a notch 52a on a surface thereof.

When internal pressure in the case 15 is increased, the short member 52 may deform to contact the first short tab 51, i.e., while being deformed upwardly, and to induce a short-circuit. When the short-circuit occurs, an excessive amount of current flows and melts at least one of the fuse portions 31a and 32a, thereby preventing current flow to the first and second terminals 21 and 22. In addition, when the internal pressure of the case 15 is continuously increased, e.g., after the fuse portions 31a and 32a are operated, the notch 52a in the short member 52 may break and internal gas in the case 15 may be emitted through the vent hole 51a. For example, if the notch 52a is formed in the short member 52, an additional notch is not required for emitting the internal gas, so the vent 25 with the vent hole 24, i.e., as described with reference to FIG. 2, may be omitted.

Figure 8:
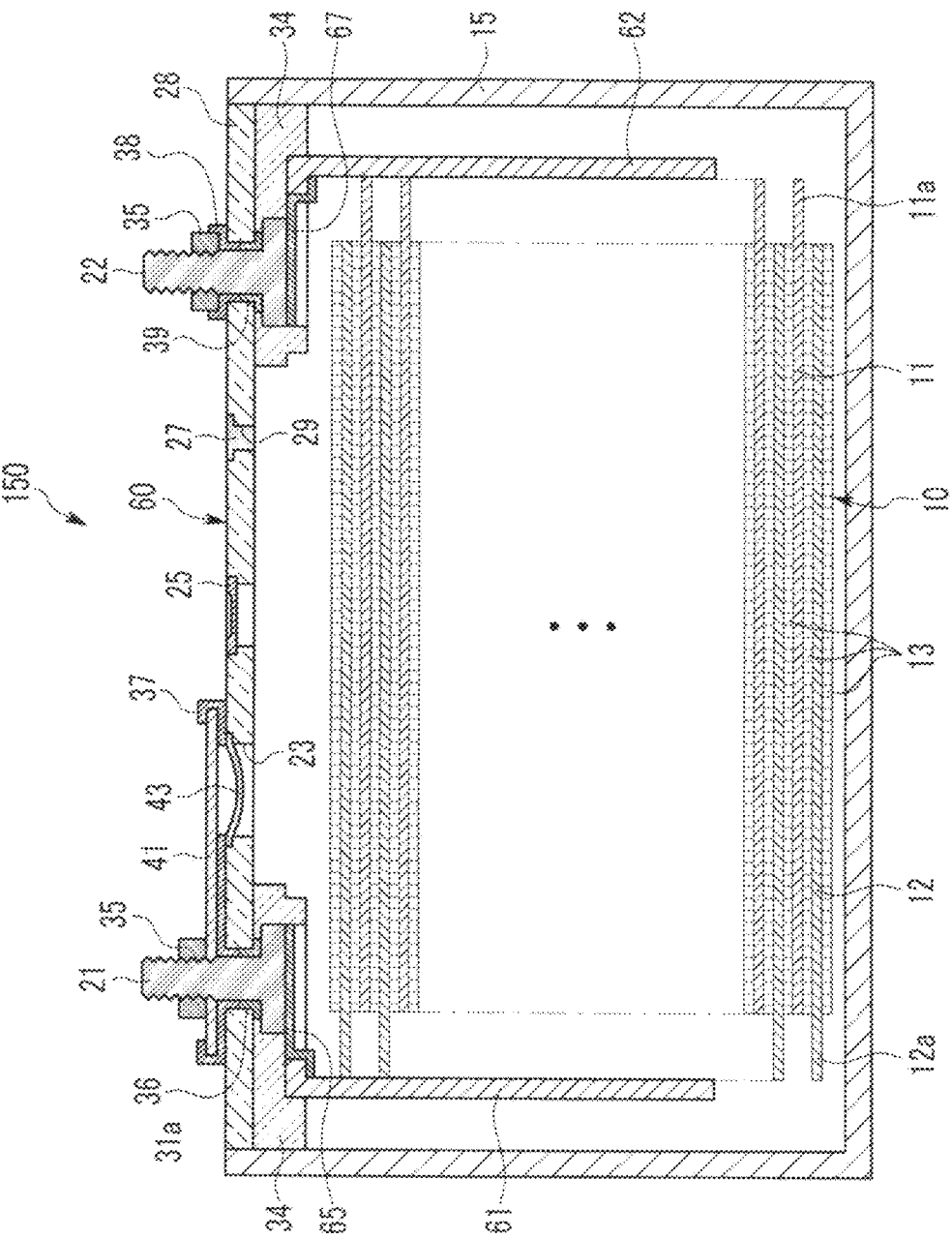
FIG. 8 illustrates a cross-sectional view of a rechargeable battery according to another exemplary embodiment.

FIG. 8 illustrates a cross-sectional view of a rechargeable battery according to a fifth exemplary embodiment. Referring to FIG. 8, a rechargeable battery 150 is substantially the same as the rechargeable battery 110 described previously with reference to FIGS. 1-3, with the exception of a structure of the lead tabs.

The rechargeable battery 150 may include the case 15 and a cap assembly 60 sealing the case 15. The cap assembly 60 may include the first terminal 21, the second terminal 22, the cap plate 28 attached to the opening of the case 15, and the first short tab 41 electrically connected to the first terminal 21 and provided on the cap plate 28. The cap plate 28 may be electrically connected to the second terminal 22 through the connection plate 38.

The short hole 23 may be formed under the first short tab 41, and the short member 43 may be configured to deform and induce a short-circuit of the cap plate 28 and the first short tab 41. The short member 43 may be formed in the short hole 23. The short member 43 may include an inversion plate.

The first terminal 21 may be electrically connected to the second electrode 12 through a first lead tab 61, and the second terminal 22 may be electrically connected to the first electrode 11 through a second lead tab 62. The first and second lead tabs 61 and 62 may include first and second fuse portions 65 and 67, respectively. For example, each of the first and second lead tabs 61 and 62 may include a respective fuse portion extending along a horizontal direction and a vertical portion, i.e., an electrode assembly joining portion, extending from the fuse portion in a downward direction to contact the electrodes in the electrode assembly 10. The first fuse portion 65 may be disposed between the first terminal 21 and the first lead tab 61, and the second fuse portion 67 may be disposed between the second terminal 22 and the second lead tab 62. For example, the first and second fuse portions 65 and 67 may be fixed to respective terminals and lead tabs by welding.

For example, the first fuse portion 65 may extend horizontally on, e.g., directly on, a bottom of the first terminal 21, e.g., completely overlap the bottom of the first terminal 21. The vertical portion of the first lead tab 61 may extend from an edge of the first fuse portion 65, so the first fuse portion 65 may completely separate the first terminal 21 from the vertical portion of the first lead tab 61. Therefore, when the first fuse portion 65 melts as a result of a short-circuit in the rechargeable battery 150, the first terminal 21 and the vertical portion of the first lead tab 61 may be completely separated from each other. The structure of the second fuse portion 67 is substantially the same as that of the first fuse portion 65.

The first and second fuse portions 65 and 67 may be formed separately from, i.e., formed of different materials than, the vertical portions of the first and second lead tabs 61 and 62. The first and second fuse portions 65 and 67 may be formed of a material having a lower melting point than other portions of the respective first and second lead tabs 61 and 62, e.g., a lower melting point than the vertical portions of the lead tabs. The vertical portions of the first and second lead tabs 61 and 62 may be formed of different materials. For example, the vertical portion of the first lead tab 61 may be formed of copper, the vertical portion of the second lead tab 62 may be formed of aluminum, and the fuse portions 65 and 67 may be formed of lead. Therefore, when the rechargeable battery 150 is short-circuited, the high current flow melts the first and second fuse portions 65 and 67 before affecting other portions of the lead tabs, thereby disconnecting the terminals form the lead tabs.

Figure 9:
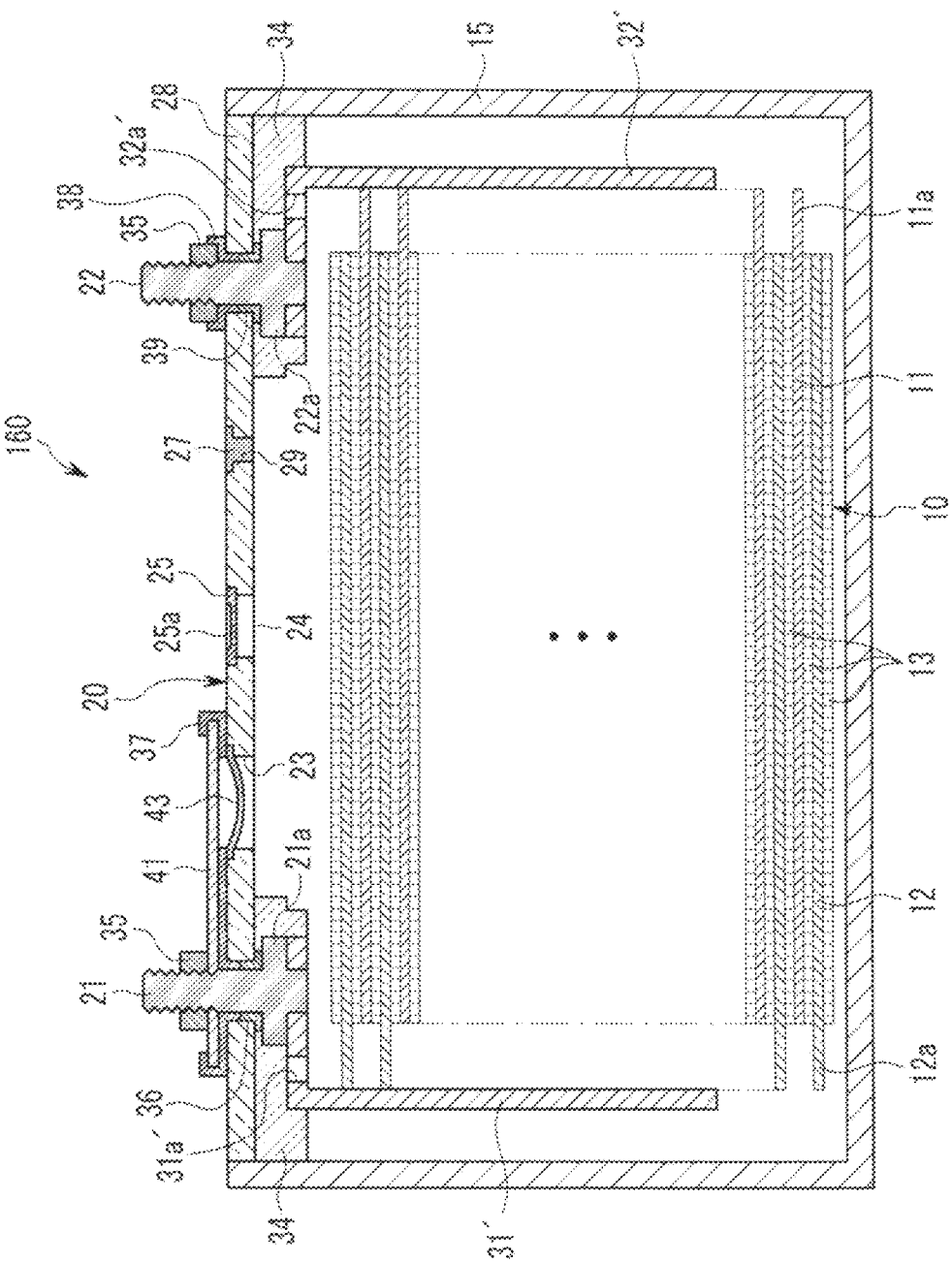
FIG. 9 illustrates a cross-sectional view of a rechargeable battery according to another exemplary embodiment.
Figure 10:
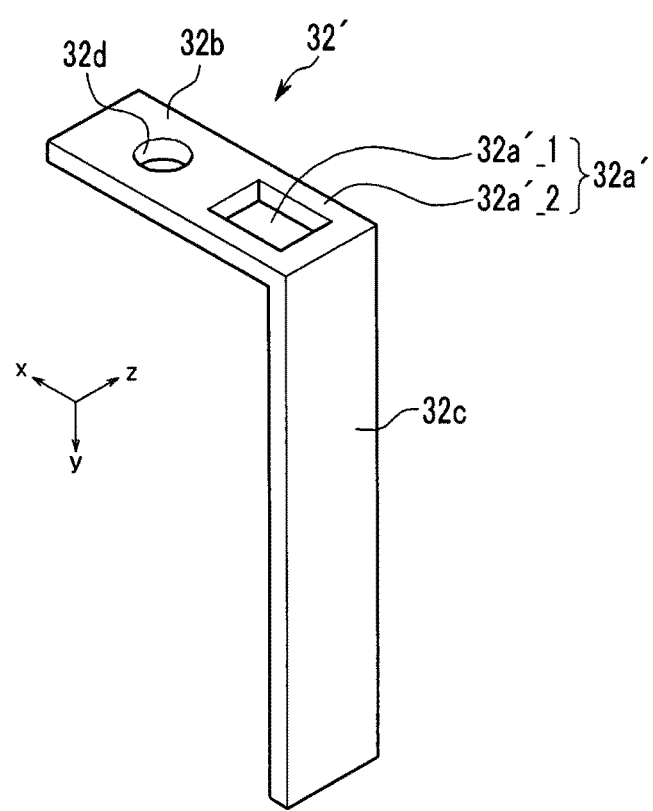
FIG. 10 illustrates an enlarged perspective view of a lead tab in FIG. 9.

FIG. 9 illustrates a cross-sectional view of a rechargeable battery according to a sixth exemplary embodiment. FIG. 10 illustrates a perspective view of a lead tab in the sixth exemplary embodiment. Referring to FIGS. 9 and 10, a rechargeable battery 160 may be substantially the same as the rechargeable battery 110 described previously with reference to FIGS. 1-3, with the exception of the fuse structure in the lead tab. Only differences between the rechargeable battery 110 and the rechargeable battery 160 will be described hereinafter.

As illustrated in FIGS. 9 and 10, the rechargeable battery 160 may include first and second lead tabs 31' and 32' with first and second fuse portions 31*a*' and 32*a*', respectively. Each of the first and second fuse portions 31*a*' and/or 32*a*' may include at least one opening.

The first and second fuse portions 31*a*' and 32*a*' may be formed in both of the first and second lead tabs 31' and 32', but exemplary embodiments are not limited thereto. For example, the first and second fuse portions may be formed in one of the first and second lead tabs 31' and 32'.

The second lead tab 32' may include the terminal joining portion 32*b*, the electrode assembly joining portion 32*c*, and the fuse portion 32*a*'. The terminal joining portion 32*b* may include the terminal hole 32*d* formed under the second terminal 22 and to which the second terminal 22 is inserted. The electrode assembly joining portion 32*c* may be formed under the terminal joining portion 32*b*, and may be welded to the positive uncoated region 11*a*. The first lead tab 31' may be substantially the same as the second lead tab 32'.

The fuse portion 32*a*' may be disposed between the terminal joining portion 32*b* and the electrode assembly joining portion 32*c*, and may have the at least one opening 32*a*'_1. For example, the fuse portion 32*a*' may include members 32*a*'_2 connecting, e.g., directly connecting, the terminal joining portion 32*b* and the electrode assembly joining portion 32*c* to each other, so the opening 32*a*'_1 may be between the members 32*a*'_2 along the z-axis and between the terminal joining portion 32*b* and the electrode assembly joining portion 32*c* along the x-axis.

Figure 11:
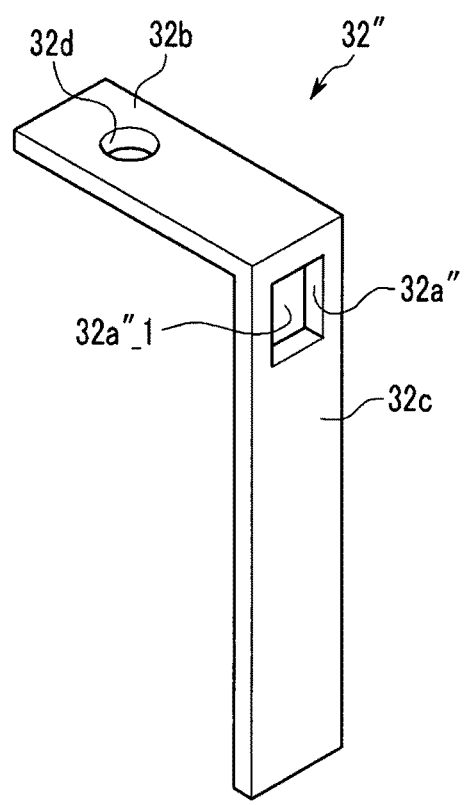
FIG. 11 illustrates a perspective view of a lead tab according to another exemplary embodiment.

As illustrated in FIG. 10, the opening 32*a*'_1 may be in the xz-plane, i.e., coplanar with the terminal hole 32*d*, and the electrode assembly joining portion 32*c* may be vertically bent after passing the fuse portion 32*a*'. Alternatively, as illustrated in FIG. 11, a second lead tab 32" may include a fuse portion 32*a*" with an opening in a plane substantially perpendicular to that of the terminal hole 32*d*, i.e., in the zy-plane. Other features of the second lead tab 32" may be substantially the same as those of the second lead tab 32' described previously with reference to FIG. 10.

A rechargeable battery according to exemplary embodiments may include a cap plate with a short member configured to deform and electrically connect positive and negative electrodes, e.g., during overcharge of the battery, and a lead tab with at least one fuse electrically connected to one of the negative and positive electrodes of the battery. The battery may include various means for preventing overcharge, e.g., adjusting battery materials to control heat. However, when the battery overcharges, e.g., when pressure in the battery case exceeds a predetermined threshold, the short member may deform to electrically connect positive and negative electrodes, thereby triggering an external short circuit of the rechargeable battery. The short circuit causes a high current flow that melts the fuse in the lead tab. Melting or blowing of the fuse may stop or prevent overcharge of the battery and may increase safety of the battery.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A rechargeable battery, comprising:
    an electrode assembly in a battery case, the electrode assembly including a positive electrode, a negative electrode, and a separator;
    a cap plate connected to the battery case, the cap plate including a short member configured to deform and electrically connect the positive and negative electrodes;
    a short tab on the cap plate, the short tab being in continuous electrical contact with a terminal in the cap plate; and
    a current collecting portion including at least one fuse, the at least one fuse being electrically connected to one of the negative and positive electrodes of the electrode assembly,
    wherein the fuse and the short member are electrically connected in series when the short member is deformed.

2. The rechargeable battery as claimed in claim 1, wherein the cap plate includes at least one terminal electrically connected to the electrode assembly, the short member electrically contacting an external portion of the at least one terminal after being deformed, and the external portion of the at least one terminal being above and completely outside an uppermost surface of the cap plate.

3. The rechargeable battery as claimed in claim 1, wherein the fuse is thinner than other segments of the current collecting portion.

4. The rechargeable battery as claimed in claim 1, wherein the fuse is integral with and connects two segments of the current collecting portion.

5. The rechargeable battery as claimed in claim 4, wherein the fuse has at least one opening.

6. The rechargeable battery as claimed in claim 5, wherein the at least one opening of the fuse is between a terminal joining portion of the current collecting portion and an electrode assembly joining portion of the current collecting portion.

7. The rechargeable battery as claimed in claim 5, wherein the at least one opening of the fuse is coplanar with a terminal hole in the current collecting portion.

8. The rechargeable battery as claimed in claim 5, wherein the at least one opening of the fuse is in a plane substantially perpendicular to a plane of a terminal hole in the current collecting portion.

9. The rechargeable battery as claimed in claim 1, wherein the fuse includes a first material and a vertical portion of the current collecting portion includes a second material, the first and second materials being different from each other.

10. The rechargeable battery as claimed in claim 9, wherein the first material has a lower melting point than the second material.

11. The rechargeable battery as claimed in claim 9, wherein the fuse directly contacts a terminal in the cap plate.

12. The rechargeable battery as claimed in claim 1, further comprising an insulation layer between the cap plate and the current collecting portion, the insulation layer overlapping at least a portion of the fuse.

13. The rechargeable battery as claimed in claim 1, wherein the fuse is a thermal fuse.

14. The rechargeable battery as claimed in claim 1, wherein:
  edges of the short member contact an upper surface of the cap plate and are level therewith,
  the short member has a first state and a second state, in the first state the short member has a convex shape protruding toward an interior of the battery case, and in the second state the short member is a deformed short member protruding away from the interior of the battery, and
  the deformed short member electrically contacts both the positive and negative electrodes of the electrode assembly.

15. The rechargeable battery as claimed in claim 14, wherein the short member includes a notch configured to break when the short member is deformed.

16. The rechargeable battery as claimed in claim 1, wherein the cap plate includes an opening therethrough, the short member being positioned in the opening.

17. The rechargeable battery as claimed in claim 1, wherein the cap plate includes an opening therethrough, the short tab overlapping the opening and the short member.

18. The rechargeable battery as claimed in claim 1, wherein the short tab and the short member are directly contacting each other when the short member is deformed.

19. The rechargeable battery as claimed in claim 1, wherein:
  the fuse is in electrical contact with the terminal in the cap plate,
  the short member is a deformable member, the short member protruding away from an interior of the battery when deformed, and
  the short member directly contacts the short tab when deformed, the fuse being configured to blow in response to a contact between the short member and the short tab.

20. The rechargeable battery as claimed in claim 1, wherein the short member includes a middle member, the middle member contacting the short tab when the short member is deformed.

21. The rechargeable battery as claimed in claim 1, wherein a distance between a center of the short member and the short tab equals 2*h or less, "h" being a distance by which the short member deviates from being flat.

22. The rechargeable battery as claimed in claim 1, wherein the fuse is between the electrode assembly and a lowermost surface of the cap plate.

* * * * *